United States Patent [19]
Stimpfl

[11] Patent Number: 6,106,878
[45] Date of Patent: Aug. 22, 2000

[54] METHOD FOR SEPARATING SAUSAGES

[75] Inventor: Christof Stimpfl, Vogt, Germany

[73] Assignee: Stimpfl & Gieseler GmbH, Vogt, Germany

[21] Appl. No.: 09/358,672

[22] Filed: Jul. 22, 1999

[51] Int. Cl.[7] ............................... A23L 3/005; A23L 3/32

[52] U.S. Cl. ........................ 426/248; 83/19; 219/121.67

[58] Field of Search ................................. 426/248; 83/19; 219/121.67

[56] References Cited

U.S. PATENT DOCUMENTS

| | | | |
|---|---|---|---|
| 4,486,645 | 12/1984 | Jedlicka et al. | 219/121 |
| 4,875,254 | 10/1989 | Rudy et al. | 17/61 |
| 5,243,886 | 9/1993 | Rudy et al. | 83/19 |

*Primary Examiner*—Nina Bhat
*Attorney, Agent, or Firm*—Bachman & LaPointe, P.C.

[57] ABSTRACT

In a method for separating sausages which are joined together by means of a twisting point at which a clip may be situated, the twisting point is to be cut through by a laser beam.

13 Claims, 4 Drawing Sheets

METHOD FOR SEPARATING SAUSAGES

BACKGROUND OF THE INVENTION

The invention relates to a method for separating sausages which are joined together by means of a twisting point at which a clip may be situated.

Nowadays, sausages are produced by filling a skin, whether this be a natural or synthetic skin, with a suitable sausage filling in sausage portions. The individual sausages are separated between the individual portions, usually by fitting clips and/or twisting the skin, for which reason this point is also known as the twisting point. The result is a string of sausages, from which these sausages subsequently have to be cut off, for example in order to automatically package a certain number of sausages. Today this is still carried out, at great expense, by hand.

DD 106 131 has disclosed a device for separating individual sausages from a string of sausages, which device comprises two part conveyor systems, each with a pair of conveyor belts. If a twist between the sausages passes through a detection system, a separation system is actuated and the twist is cut through. This detection system operates using a light barrier and mirrors and is therefore unsuitable for precise control of the cutting operation at the desired high speeds. A light barrier of this nature is extremely sensitive to extraneous light, and the mirrors are subject to contamination, so that the determination of twisting points is extremely unsatisfactory. This alone renders known devices unsuitable. In addition, the cutting device itself, which is designed as a lifting blade, has proven entirely unsuitable for the speeds which are required nowadays. The device is dubious in safety terms, since it has a valve shut-off system which always returns to the starting position even in the event of a fault.

Furthermore, DE-A 31 21 432 has disclosed a sausage-cutting machine of the type mentioned above which has a sensor whose radiation source feeds a beam of electromagnetic waves beyond the path of the sausages to a sensor. In this case too, mirrors are used, and these can easily become contaminated or coated with a film of grease from the sausages. The blade and its drive are entirely unsuitable for the high working rate of a sausage-cutting machine which is required nowadays.

DE-A 43 07 637 has also disclosed a device for separating sausages from a string of sausages. This document primarily describes a method with which a twisting point between two sausages can be accurately determined. This method has significant advantages, since it is also possible to determine irregularities in a twisting point with extremely high accuracy. However, a motor with a blade is activated by means of a corresponding sensor which accurately determines the twisting point or the desired cutting point, this blade finally completing the cutting operation.

The present invention is based on the object of improving the separation of sausages.

SUMMARY OF THE INVENTION

The object is achieved when the twisting point is cut through by a laser beam.

This laser beam has the advantage that it allows significantly more precise and accurate operation than, for example, a blade. Particularly if the above-mentioned method for exact determination of the separation point is used, it is important for the cutting device also to be able to follow this exact determination. This is achieved by means of the laser beam according to the invention. The laser beam smoothly cuts through the sausage casing, whether this be a natural or synthetic skin, without there being any damage whatsoever to the sausage. Furthermore, the laser beam has the advantage that a synthetic skin is welded closed at the cutting point. As a result, no sausage filling emerges from this cutting point.

Particularly in the American sausage-producing industry, it is very often the case that the twisting points are of different lengths. Since an excessively long tail on a sausage is undesirable, two cuts should be made at an excessively long twisting point, one shortly after one sausage and the other shortly before the next sausage. This can be carried out using a laser beam or else using a second laser beam which carries out the second cut before the next sausage. For example, it is possible to arrange two light guides of a laser on two turntables on one shaft of a servomotor, which light guides are turned a few degrees in relation to one another. By means of an additional motor, one turntable can be rotated with respect to the other, thus adjusting the angle. If the twisting point is long, a larger angle is set than for a short twisting point. The servomotor then only has to rotate in one direction.

In order to use a laser beam to cut out a clip from a twisting point, there is provision for a laser beam to be emitted with a diameter which is larger than the width of a clip.

There are a number of possibilities for the cutting operation using the laser beam. Firstly, the laser source or the laser output itself can be used to carry out a separation movement.

In the case of a second possibility, consideration may be given to emitting laser beam pulses, since it is known that it is possible to emit laser pulses in the picosecond range.

A further possibility consists in continuously emitting a laser beam but incorporating a movable blocking element between the laser source and the separation point. If the blocking element is pulled away, the laser beam is freed to carry out a separation.

There is the further problem that the twisting point moves during cutting, which would result in an inclined laser cut. To counteract this drawback, it is possible, for example, for the laser beam also to be guided at an angle; alternatively, a rotary plate which has at least one slot is arranged above the twisting point, and the laser beam passes through the slot onto the twisting point when cutting. Since the plate rotates at the same speed as the movement of the twisting point, the slot remains above the twisting point and the latter is cut only at this point.

These are only a few exemplary embodiments; further possible options are also to be incorporated by the present invention.

BRIEF DESCRIPTION OF THE DRAWINGS

Further advantages, features and details of the invention will emerge from the following description of preferred exemplary embodiments and with reference to the drawing, in which.

DETAILED DESCRIPTION

Figure 1:
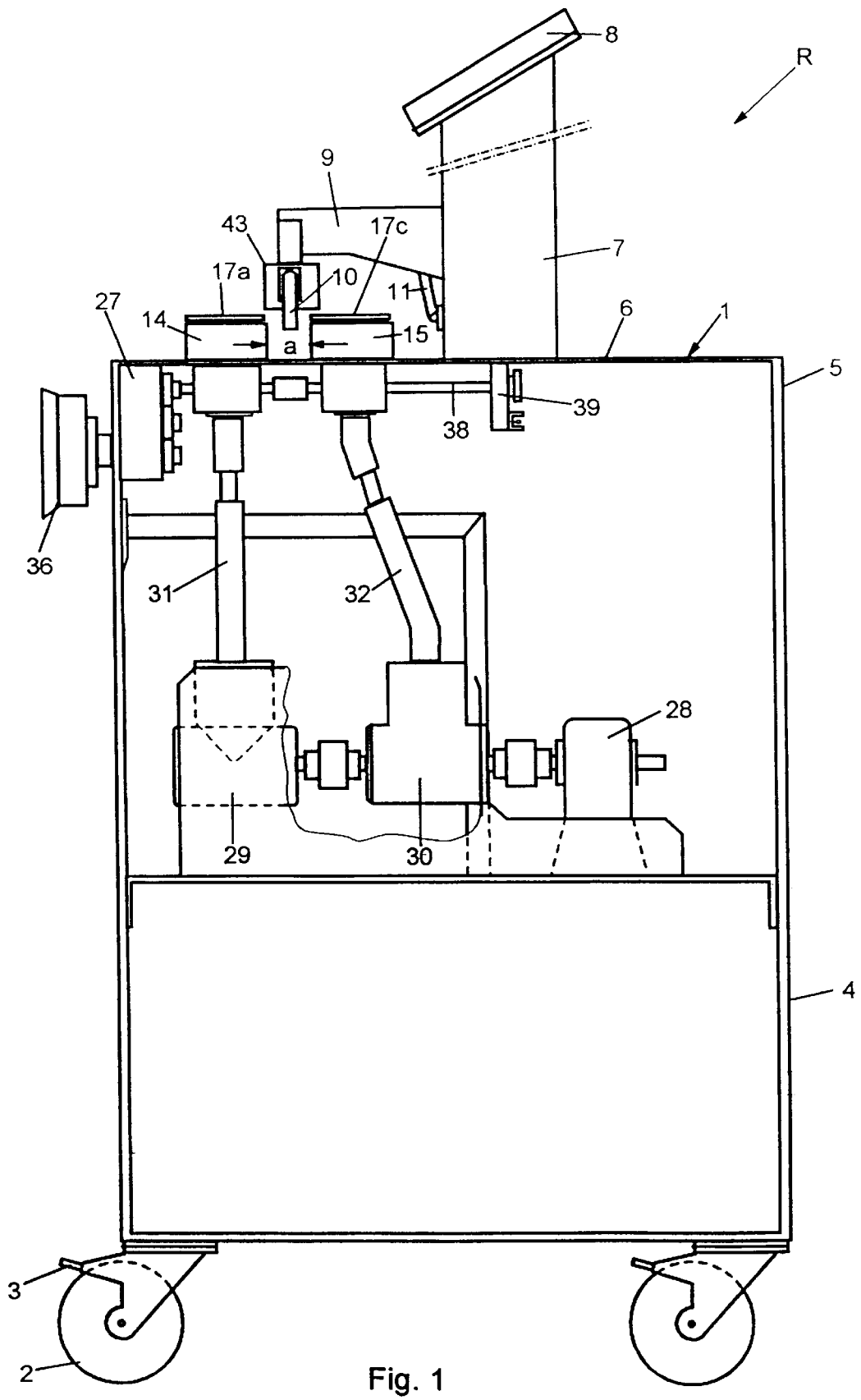
FIG. 1 shows a partially cut-away side view of a device according to the invention for separating sausages.

A device R according to the invention for separating sausages which are produced in strings has a housing case 1 which can move on castors 2. These castors 2 can be locked by means of brake levers 3. Furthermore, the housing case 1 essentially comprises a bottom cabinet 4 and a top part 5, the latter containing functional components which are essential for operation of the device according to the invention. It will of course be understood that both bottom cabinet 4 and top part 5 are covered by suitable side plates, etc. The only essential factor is the upper cover of the top part 5, which serves as a slideway 6 for a string of sausages.

On the slideway 6, a display 8, which contains an indication means (not shown in more detail) or an input panel for controlling the device R, is fitted on a column 7.

Furthermore, a cantilever arm 9, which holds a pressure roll 10, projects from the column 7, which pressure roll 10, in the position of use, presses the string of sausages onto the slideway 6. The height or arrangement of the cantilever arm 9 can be adjusted, to which end a lifting cylinder 11, which is only diagrammatically indicated, is provided.

Figure 2:
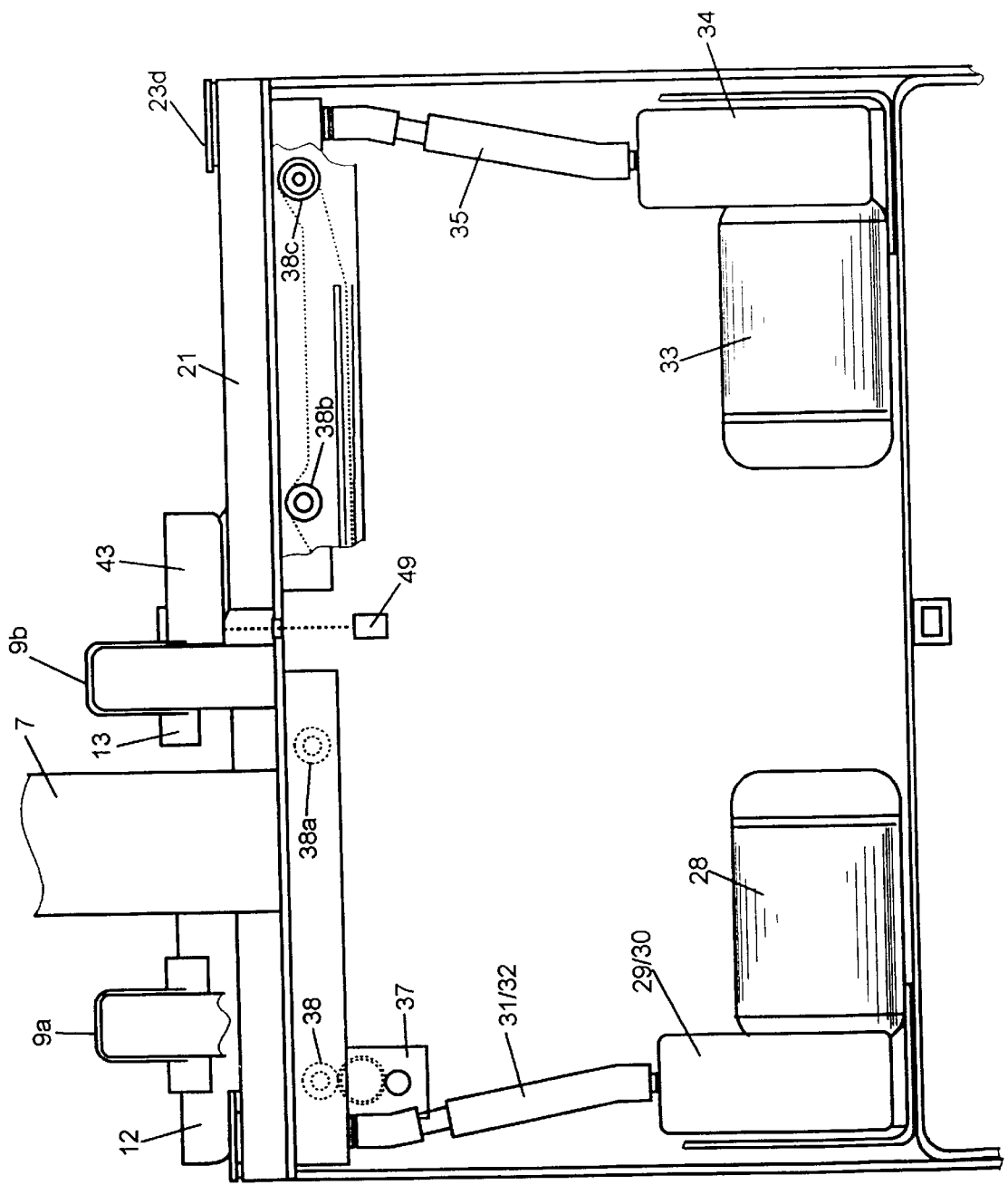
FIG. 2 shows a further partially cut-away side view of an opened device in accordance with FIG. 1.
Figure 3:
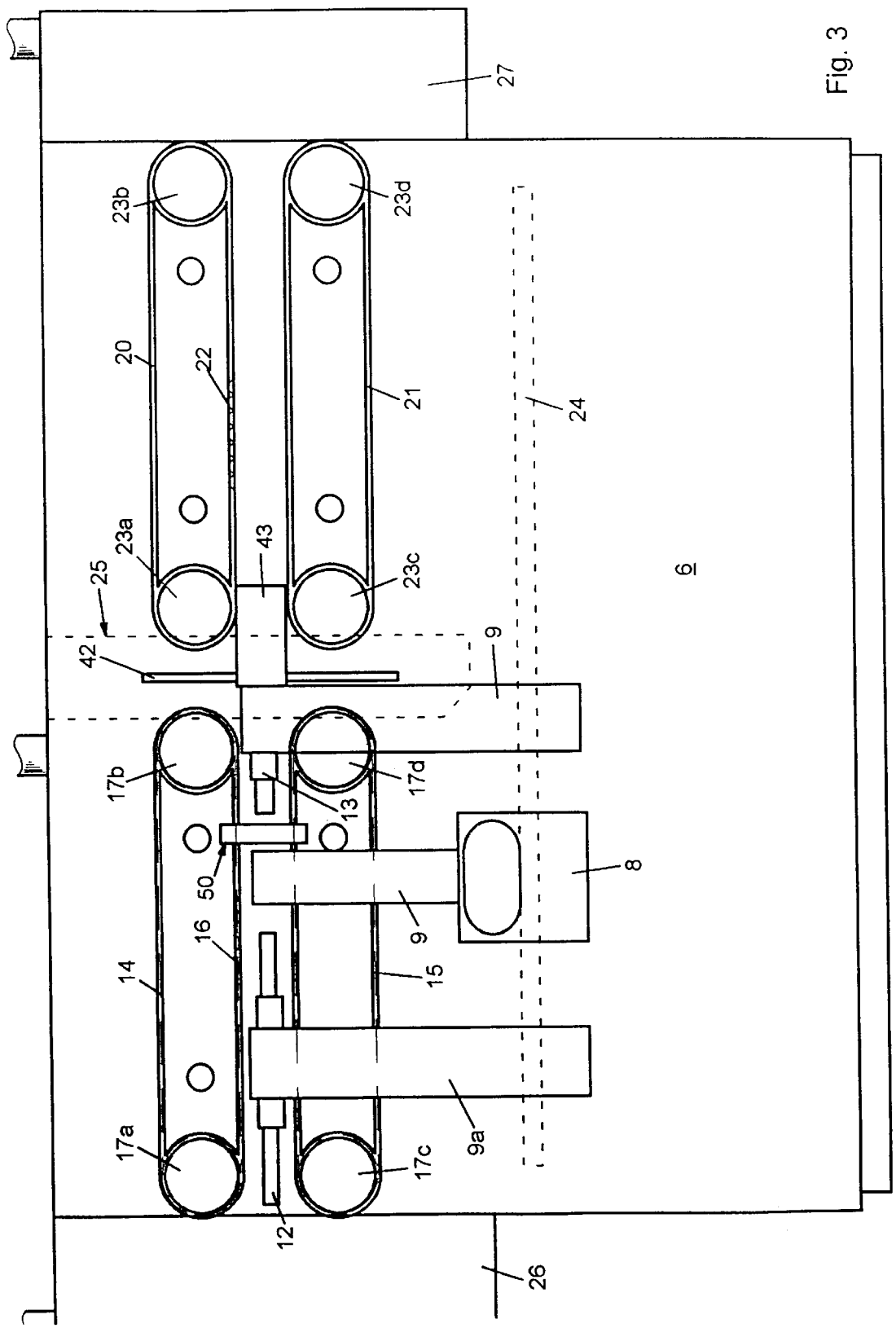
FIG. 3 shows a plan view of the device in accordance with FIG. 1.

Moreover, as shown in FIGS. 2 and 3, further cantilever arms 9a and 9b are situated to the left and right of the column 7, rail-like holding pieces 12 and 13 being provided on these cantilever arms 9a and 9b. These holding pieces 12 and 13, and also the pressure roll 10, engage between two conveyor belts 14 and 15 which are arranged at a variable distance a from one another. As shown in FIG. 3, all the cantilever arms 9, 9a and 9b are arranged on a common rotary shaft 24, so that they can be raised or lowered together, for example also by means of a lifting cylinder 11.

As indicated in FIG. 3, the conveyor belts 14 and 15 are designed as endless double-toothed belts, these double-toothed belts having toothing 16 which is directed inward as well as outward. By means of the inwardly directed toothing, the conveyor belts 14 and 15 wrap around guide rollers 17a, 17b, 17c and 17d, while the string of sausages (not shown in more detail) is guided by the mutually facing teeth of the double-toothed belt. As a result, the string of sausages is held securely between the two conveyor belts 14 and 15.

Two further conveyor belts 20 and 21 follow at an intersection 25, which is described below, but these further conveyor belts 20 and 21, as single toothed belts, are provided only with inwardly directed toothing 22. In this case too, suitable guide rollers 23 are again provided. These conveyor belts 20 and 21 are used to convey the sausages which have been separated from the string of sausages at the intersection 25 onward individually. In order to guide the string of sausages or the separated sausages, a rounded entry 26 is shown on the left-hand side of FIG. 3, and a rounded outlet 27 is provided on the right-hand side of FIG. 3.

In addition, the pairs of conveyor belts 14/15 and 20/21 are preferably driven at different speeds. The speed of the pair of conveyor belts 20/21 is slightly higher than that of the pair of conveyor belts 14/15, so that the string of sausages is tensioned slightly in the area of the inter-section, so that the cutting operation can be safeguarded.

The pair of conveyor belts 14/15 is driven by a motor 28, which is connected to the guide roller 17a or 17c respectively via a transmission 29 and 30 and corresponding links 31 and 32. As a result, the two guide rollers 17a and 17c are driven synchronously. A motor 33 with a corresponding transmission 34 and links 35 is also provided for the guide rollers 23b and 23d. As mentioned above, the motors 28 and 33 are run at different speeds.

The distance a between the conveyor belts 14/15 or 20/21 is changed by moving the guide rollers 17 or 23, this movement likewise being carried out synchronously. This is effected by means of a handwheel 36 which is connected to a spindle 38 by means of a transmission 37. On the other side of the transmission 37, the spindle 38 is held in a bearing block 39. Each guide roller 17 or 23 is assigned such a spindle 38, 38a, 38b and 38c, all the spindles 38 being connected together by means of a drive belt.

The rotational movement of the spindle 38 is transmitted to the guide roller 17 or 23 in a known manner, for example by means of worm wheels with suitably arranged toothing.

Figure 4:
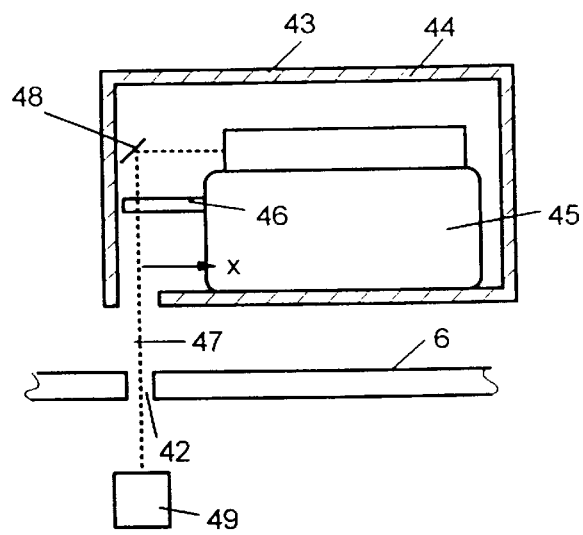
FIG. 4 shows a diagrammatic illustration of a cutting device according to the invention.

A cutting device according to the invention is arranged in a housing 43 at the intersection 25. An exemplary embodiment of this cutting device is illustrated in FIG. 4. The essential component of this cutting device is a laser source 44 which, in the housing 43, rests on an appliance 45 by means of which a blocking element 46 can be moved in direction x. This movement in direction x releases a laser beam 47 which comes from the laser source 44, is deflected by means of a mirror 48 and penetrates through a slot 42 in the slideway 6 and after the slot 42 is received by a collector 49. The laser beam 47 effects a separation of a twisting point at a predetermined, desired separation point.

As an alternative to using the blocking element 46, the laser source 44 may also be pulsed, so that it emits a laser beam pulse at predetermined intervals, which pulse cuts through the twisting point. In this case, the appliance 45 is also surplus to requirements. The appliance 45 may, incidentally, be designed as a simple relay-type or magnetically driven retracting means for the blocking element 46.

Another possibility consists in moving the laser beam 47. This could be achieved by moving the mirror 48, in which case the mirror 48 is moved in such a way that the laser beam 47 executes, for example, an angular movement of up to 20°, so that the twisting point between two sausages is cut through at a predetermined separation point.

Figure 5:
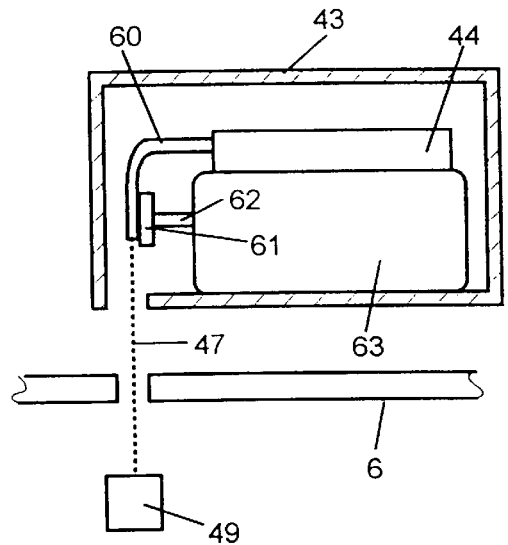
FIG. 5 shows a diagrammatic view of a further exemplary embodiment of a cutting device.

As indicated in FIG. 5, a glass fiber cable 60 could also be used as the laser output, which cable is fixed, for example, to a plate 61, the plate 61 being connected to a shaft 62 of a servomotor 63. For a cutting operation, the servomotor 63 simply executes a predetermined, desired rotational movement, so that the plate 61 is rotated together with the end of the glass fiber cable 60.

The use of a servomotor has the advantage that it is always accurately adjusted to zero, to an accuracy of the magnitude of thousandths. This is necessary in order to ensure that sausages which are transported through the device at a speed of up to 870 mm/sec are cut accurately. The device is in this case designed for a continuous capacity of approximately 480 cutting operations per minute.

Figure 6:
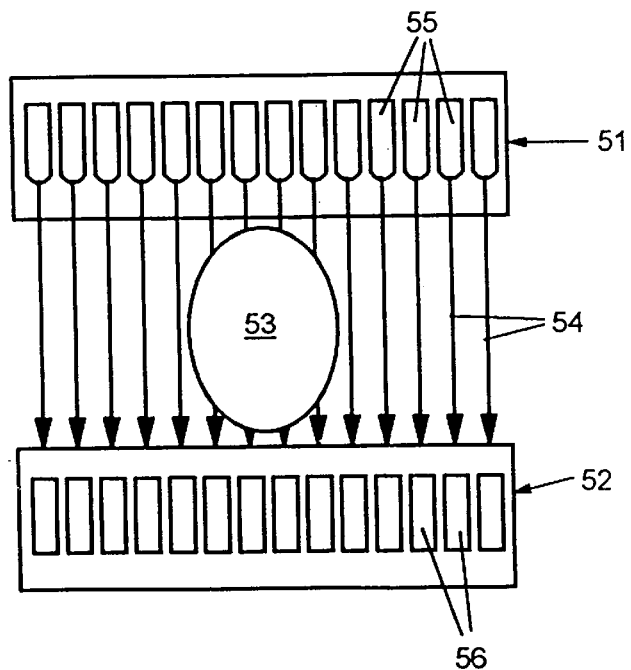
FIG. 6 shows a diagrammatic illustration of a sensor according to the invention.

A sensor 50 is connected upstream of the inter-section 25, by means of which sensor the servomotor 63 or the laser source 44, the mirror 48 or the appliance 45 is activated. In this case, the sensor is arranged approximately 100 mm in front of the slot 42. As shown in FIG. 6, the sensor 50 comprises an infrared transmitter 51 and an infrared receiver 52. Both are arranged transversely with respect to the direction in which a sausage 53 is conveyed. By means of LEDs 55, forming a multiplicity of beams 54, the infrared transmitter 51 produces a light barrier through which the sausage 53 passes. The LEDs 55 are arranged on a common line, with the result that they generate an infrared light curtain which is approx. 100 mm long.

The infrared light curtain is incident on photodiodes 56 of the infrared receiver. Depending on the irradiated surface, these photodiodes provide a series resistance to mains power from resistors which are connected in parallel, so that ultimately the current which is detected after the resistors is a reflection of the irradiated surface. By means of suitable circuit elements, this current generates a voltage drop which is fed to an analog-digital converter, where the analog value is digitized and an arithmetic mean calculation is carried out.

This sensor 50 according to the invention thus determines a voltage drop and a voltage rise in the area between two sausages and also detects one or two clips which are present. The sensor 50 in this case projects laterally beyond the sausage 53 by means of LEDs and photodiodes which serve to increase the accuracy of resolution. Although they are active, they are inactive in relation to the area of the sausage.

Should a plurality of sensors 50 be in operation next to one another, these sensors may be operated at different frequencies, so that they do not interfere with one another.

What is claimed is:

1. A method for separating individual sausages in a sausage casing from a string of sausages which are joined together at a twisting point of the sausage casing comprising the steps of:

providing a laser beam source for intermittently directing a laser beam along a first path to a separation point;

finding a string of sausages joined together at a twisting point along a second path which intersects the first path such that the string of sausages pass over the preparation point; and directing the laser beam along the first path to the separation point when a twisting point of the string of sausages is at the separation point wherein the twisting point is cut through by the laser beam.

2. The method according to claim 1, wherein a single cut is made between each sausage in the string of sausages.

3. The method according to claim 1, wherein two cuts are made between successive sausages in the string of sausages, a first cut after a sausage passes the separation point and a second cut before a sausage reaches the separation point.

4. The method according to claim 1, including the step of intermittently directing a second laser beam along a second path to a second separation point wherein the twisting point is cut through at two points between successive sausages.

5. The method as claimed in claim 4, wherein the second laser beam is turned through an angle with respect to the first laser beam and this angle is altered.

6. The method as claimed in claim 1, including the step of providing a clip at the twisting point.

7. The method as claimed in claim 1, wherein the laser beam has a diameter which is greater than the width of a clip.

8. The method as claimed in claim 1, wherein the sausage casing is welded closed by means of the laser beam.

9. The method as claimed in claim 1, wherein the laser beam source carries out a separation movement.

10. The method as claimed in claim 1, wherein a pulsed laser beam is emitted from the laser beam source on the separation point.

11. The method as claimed in claim 1, wherein the laser beam is directed at the separation twisting point, and a moveable blocking element is incorporated between the laser beam source and the separation point for intermittently directing the laser beam.

12. The method as claimed in claim 11, wherein the blocking element is a plate which has at least one slot for allowing the laser beam to pass through.

13. The method as claimed in claim 12, where in the plate rotates at a speed which corresponds to a feed rate of the string of sausages.

* * * * *